A. C. ROWLEY.
DRY VALVE.
APPLICATION FILED JULY 11, 1914.

1,162,809.

Patented Dec. 7, 1915.
7 SHEETS—SHEET 1.

INVENTOR
Arthur C. Rowley.

WITNESSES

BY

ATTORNEY

A. C. ROWLEY.
DRY VALVE.
APPLICATION FILED JULY 11, 1914.

1,162,809.

Patented Dec. 7, 1915.
7 SHEETS—SHEET 3.

WITNESSES
F. J. Hartman.
A. I. Gardner.

INVENTOR
Arthur C. Rowley.

BY

ATTORNEY

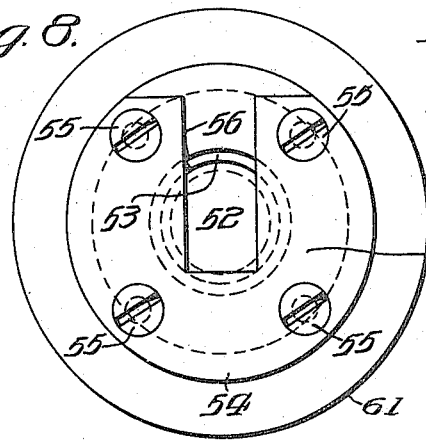
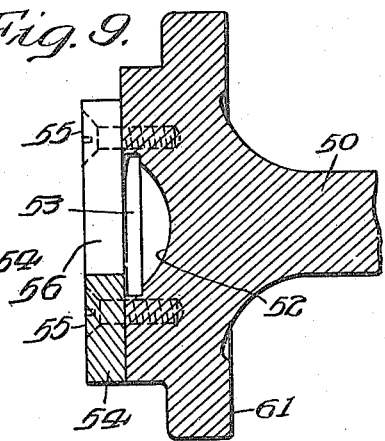
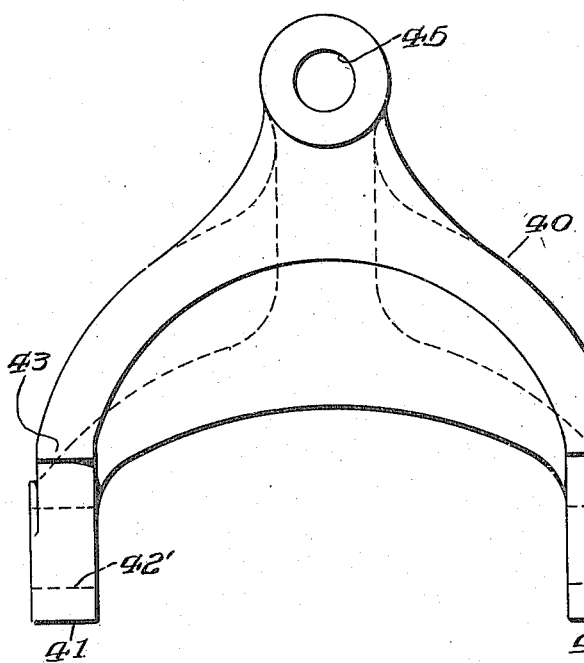
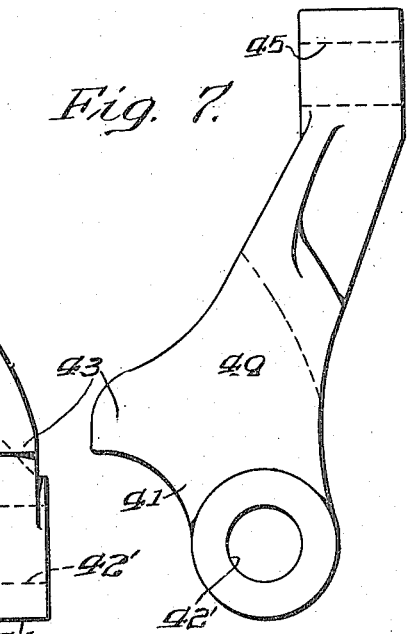

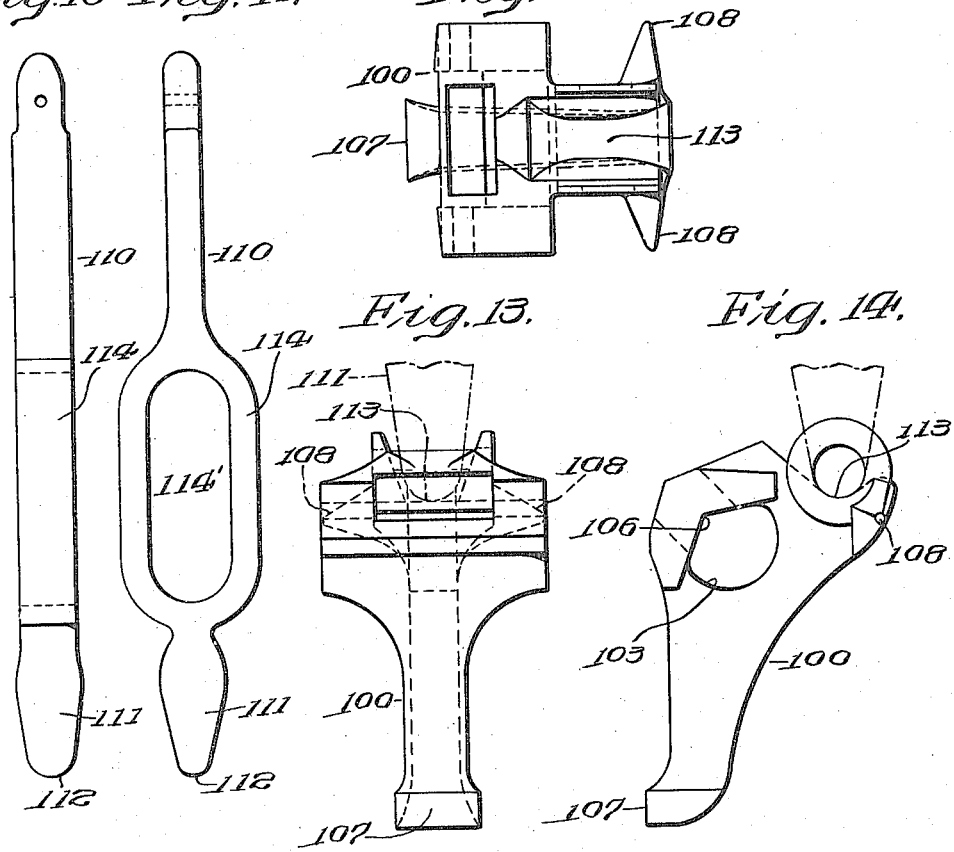
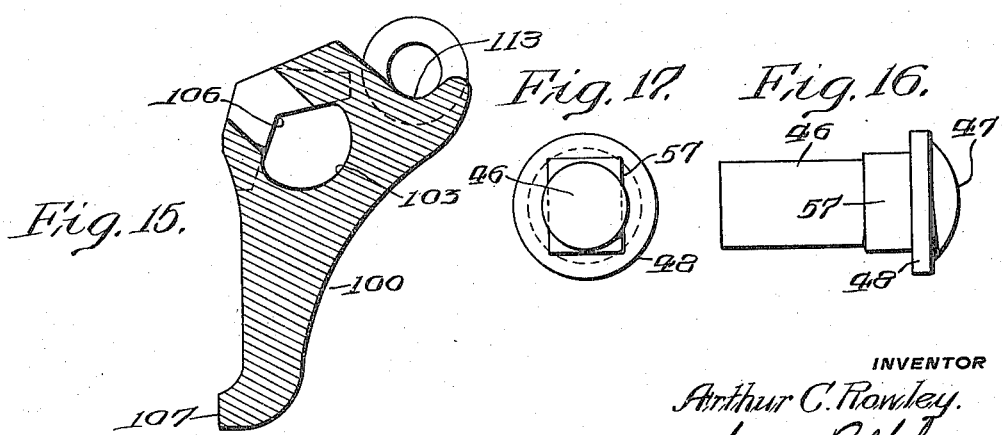

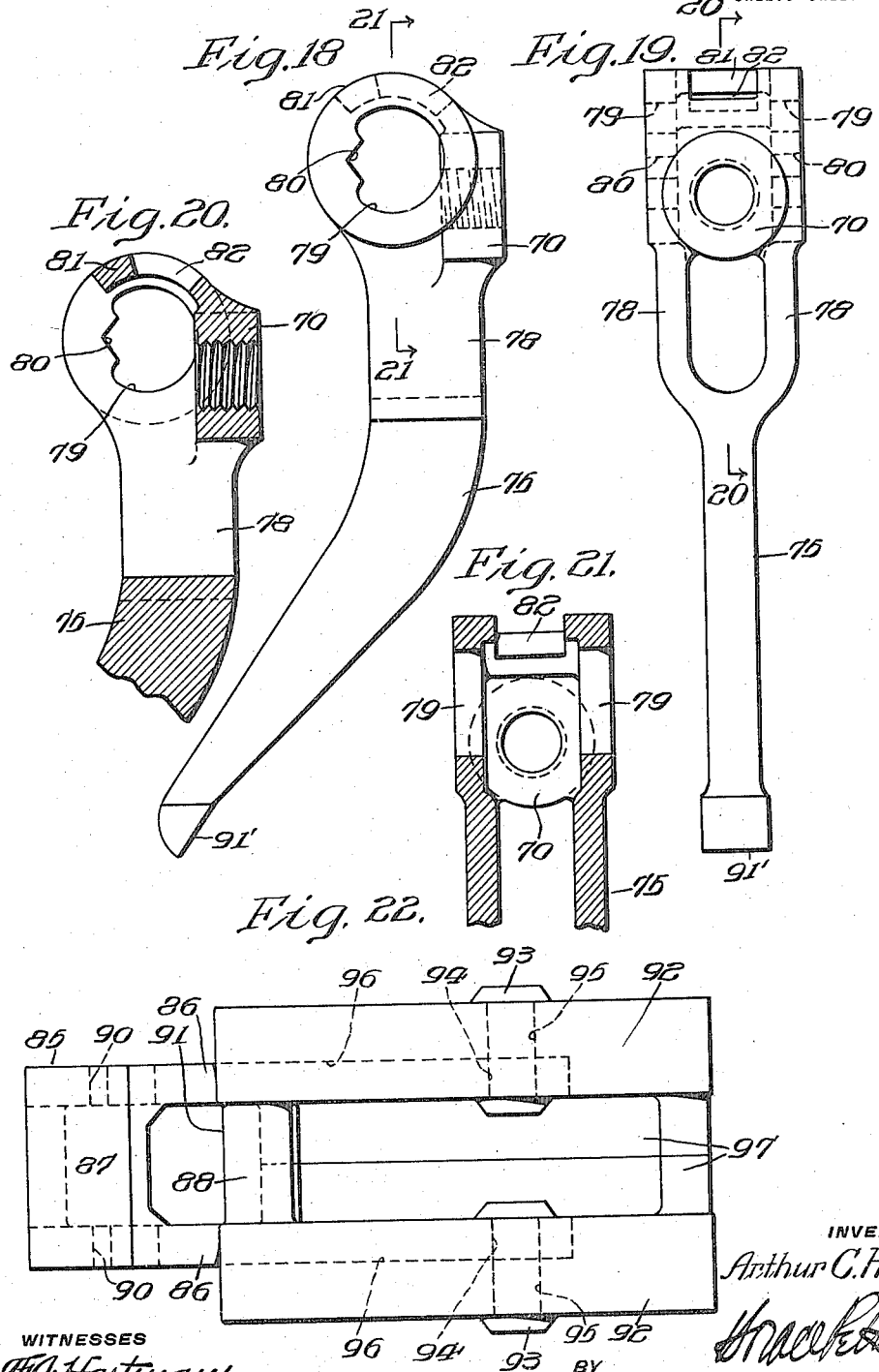

A. C. ROWLEY.
DRY VALVE.
APPLICATION FILED JULY 11, 1914.

1,162,809.

Patented Dec. 7, 1915.
7 SHEETS—SHEET 7.

WITNESSES
F. J. Hartman.
A. J. Gardner.

INVENTOR
Arthur C. Rowley.

BY

ATTORNEY

UNITED STATES PATENT OFFICE.

ARTHUR C. ROWLEY, OF PHILADELPHIA, PENNSYLVANIA, ASSIGNOR TO ASSOCIATED AUTOMATIC SPRINKLER CO., OF PHILADELPHIA, PENNSYLVANIA, A CORPORATION OF DELAWARE.

DRY VALVE.

1,162,809.   Specification of Letters Patent.   Patented Dec. 7, 1915.

Application filed July 11, 1914. Serial No. 850,298.

*To all whom it may concern:*

Be it known that I, ARTHUR C. ROWLEY, a citizen of the United States, and a resident of 2218 Vine street, city of Philadelphia, county of Philadelphia, and State of Pennsylvania, have invented certain new and useful Improvements in Dry Valves, of which the following is a specification.

The main objects of this invention are to provide an improved dry valve particularly adapted for use in controlling the inlet of water into automatic sprinkler systems; to provide in a dry valve improved means controlled by a fluid under pressure for holding a movable inlet closure in a closed position; and to provide other improvements as will appear hereinafter.

Figure 1:
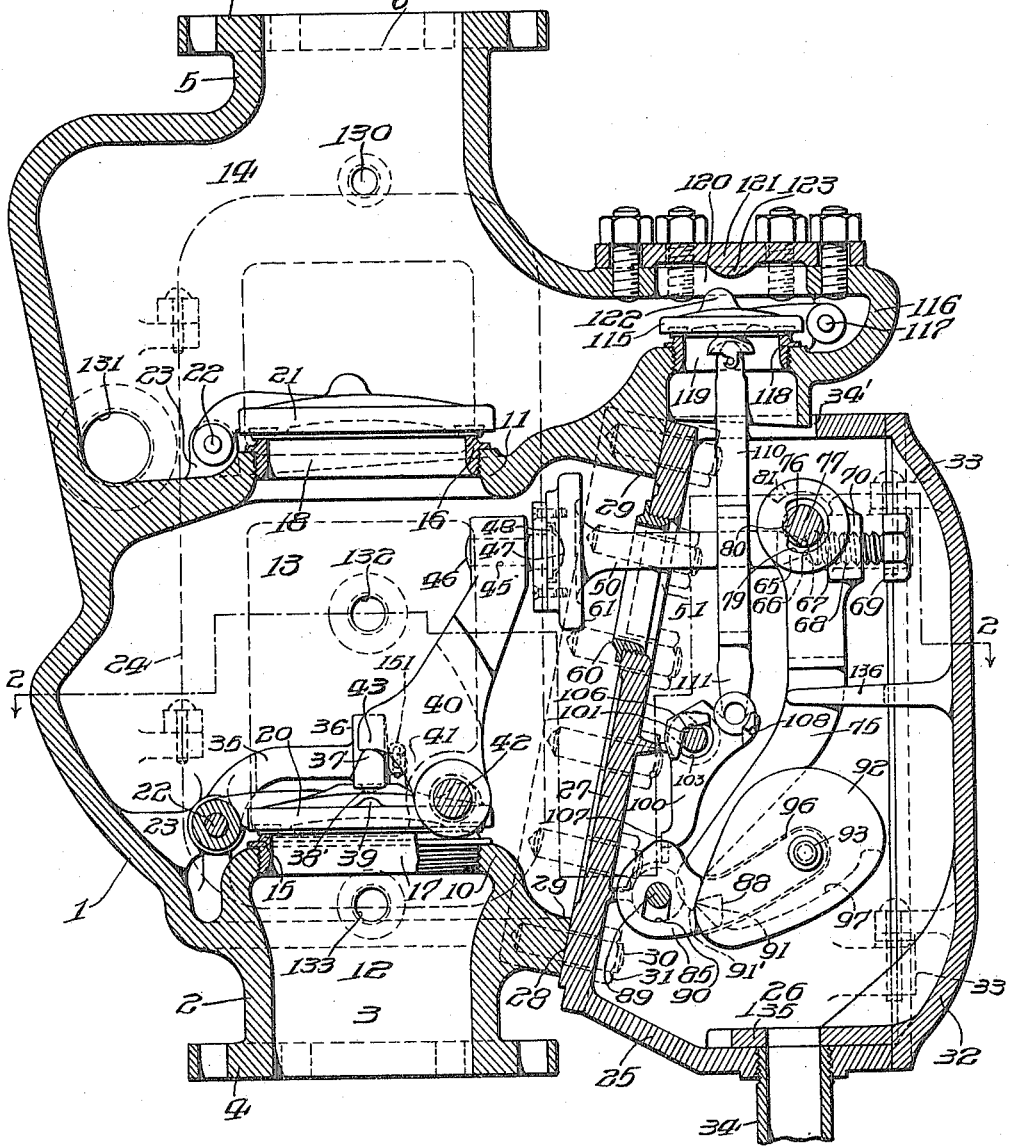
Figure 2:
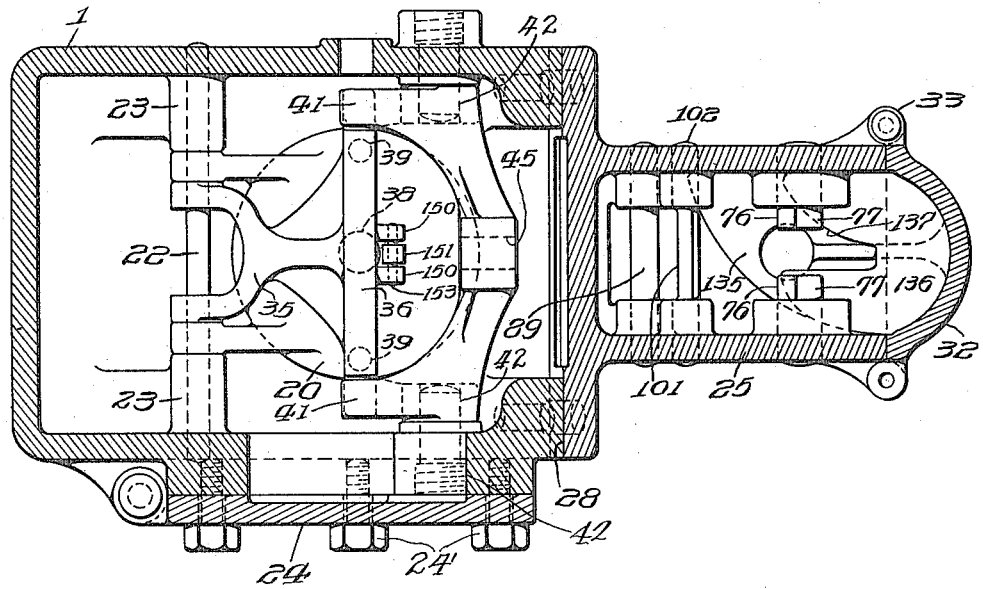
Figure 3:
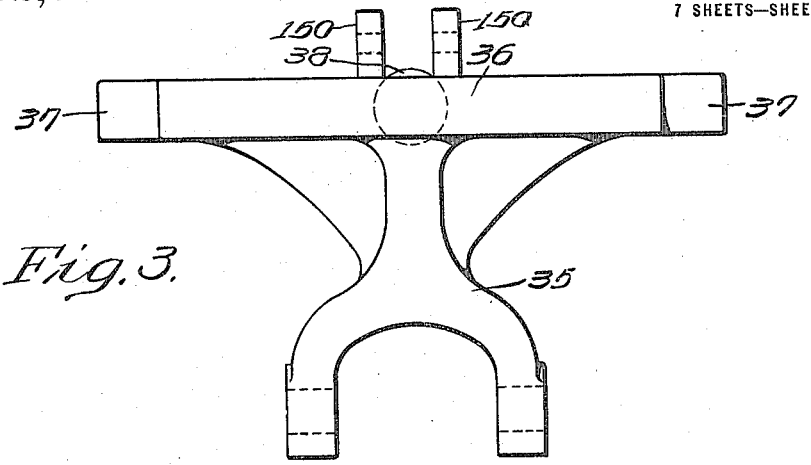
Figure 4:
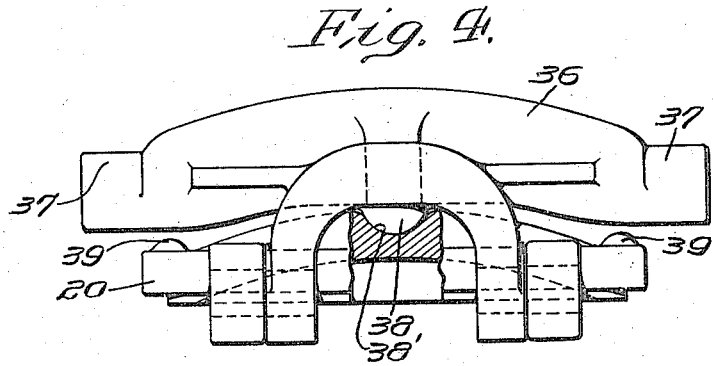
Figure 5:
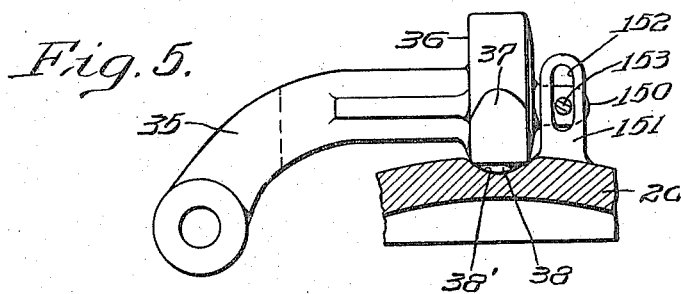
Figure 23:
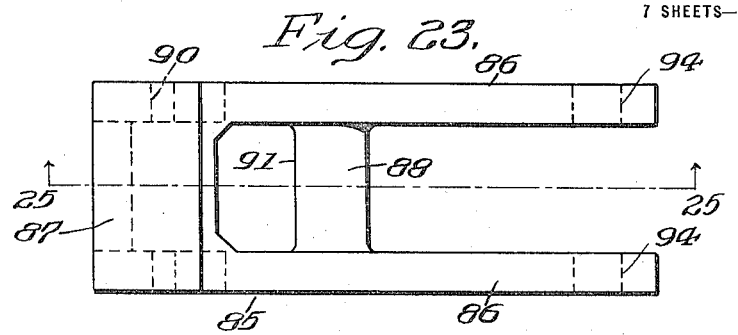
Figure 24:
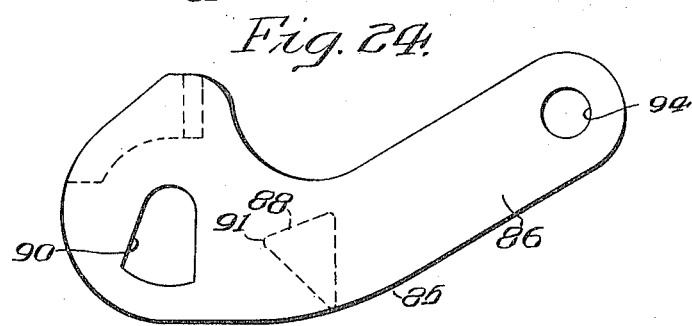
Figure 25:
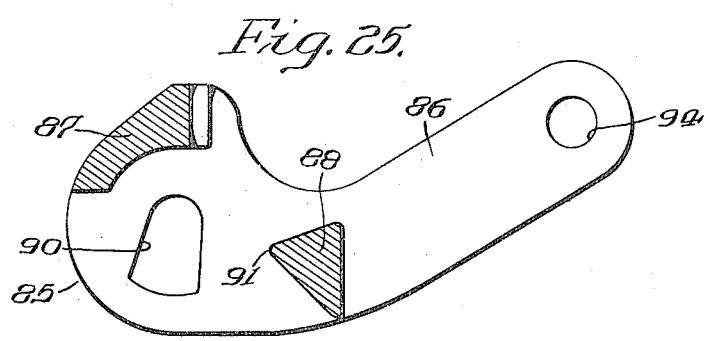
Figure 26:
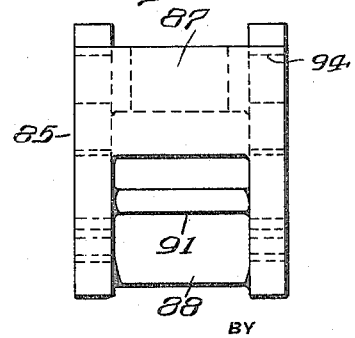

In the accompanying drawings, Figure 1 is a longitudinal central vertical section of a dry valve constructed in accordance with this invention; Fig. 2 a transverse section on line 2—2 of Fig. 1, with certain parts omitted for the sake of clearness; Figs. 3, 4, and 5, are a top plan view, a side elevation, and a front elevation, respectively, of a detail of the same, Fig. 4 showing the detail in combination with a second detail which is shown partly in vertical central section; Figs. 6 and 7 are a side elevation, and a front elevation, respectively, of another detail of the same; Figs. 8 and 9 are a side elevation, and a fragmentary longitudinal central section, respectively, of another detail of the same; Figs. 10 and 11 are a front elevation, and a side elevation, respectively, of another detail of the same; Figs. 12, 13, 14 and 15 are a top plan view, a side elevation, a front elevation, and a vertical section, respectively, of another detail of the same; Figs. 16 and 17 are a side elevation and an end elevation, respectively, of another detail of the same; Figs. 18 and 19 are a front elevation, and a side elevation, respectively of another detail of the same; Fig. 20 is a fragmentary section on line 20—20 of Fig. 19; Fig. 21 is a fragmentary section on line 21—21 of Fig. 18; Fig. 22 a top plan view of a sub-combination of elements forming a part of the same; Figs. 23, 24, 25, and 26 are a top plan view, a front elevation, a section on line 25—25 of Fig. 23, and an end elevation, respectively, of another detail of the same.

Referring to the drawings, one embodiment of this invention consists of a dry valve comprising a main casing or hollow body 1 which when in operation is arranged vertically, and which is provided at its lower end with a vertical tubular extension 2, forming a main water inlet 3 and provided at its lower end with an apertured annular flange 4 adapted to be connected to a suitable inlet pipe for supplying the main casing with water. The upper end of the main casing 1 is provided with a vertical tubular extension 5 arranged coaxially with the inlet extension 2 and providing a main outlet 6. The upper end of this extension 5 is provided with an apertured annular flange 7 adapted to be secured to a main outlet pipe leading to a sprinkler system.

The main casing 1 is divided internally by two vertically spaced transverse partitions 10 and 11 to form an inlet compartment 12, an intermediate compartment 13, and an outlet or "air" compartment 14. The partitions 10 and 11 are provided centrally with circular openings arranged coaxially with the main inlet and the main outlet, and in which are threaded annular valve seats 15 and 16 providing an inlet valve port 17 and an outlet valve port 18 which are controlled respectively by an inlet clapper or valve 20 and an outlet clapper or valve 21, which are arranged to oscillate respectively about two horizontal pivots 22 which are terminally held in fixed relationship with respect to the main casing by lugs 23 projecting inwardly from the main casing. The clappers 20 and 21 normally rest flat against the upper surfaces of the valve seats 15 and 16 respectively to hold the corresponding ports 17 and 18 closed. To permit of access to the intermediate compartment 13 and to the air compartment 14, a vertically elongated opening is provided through one side of the main casing 1 and is normally kept closed by means of a door 24 hinged to swing outwardly and provided with any suitable means as for instance bolts 24′ for clamping it in a closed position.

For holding the inlet clapper 20 normally in a closed position against a pressure of water in the inlet compartment 12, a plurality of coöperating movable elements are provided, some of which for convenience in adjustment are arranged in an auxiliary or "atmospheric" casing 25 rigidly secured to the main casing 1 and providing an auxiliary or "atmospheric" chamber 26. This auxiliary casing 25 is preferably provided with a substantially flat wall 27 which is clamped securely but removably against a flat seat 28 provided therefor on the main casing 1, and which surrounds a corresponding lateral opening 29 in the main casing 1, by means of studs 30 provided with nuts 31. The flat wall 27 forms a partition dividing the intermediate compartment 18 of the main casing 1 from the auxiliary or atmospheric compartment 26. To permit of convenient access to the movable parts within the auxiliary casing 25, the outer side wall of the auxiliary casing is formed by a vertical door 32 which is hinged as at 33 to the body portion of the auxiliary casing to open outwardly with respect thereto about a vertical axis. Any suitable means, preferably including a lock may be provided for holding the door in a closed position. The auxiliary casing communicates with the surrounding atmosphere through an "atmospheric" drain pipe 34 at its lower end and through an aperture 34' at its upper end.

Arranged in the intermediate compartment 18 of the main casing, is a yoke 35 which is arranged to oscillate coaxially with the inlet valve 20 about the horizontal pivot 22 and to swing either in unison with or independently of the inlet valve. The free end of this yoke 35 is provided with a horizontally arranged substantially rigid arched portion 36 integral therewith and extending in a direction substantially parallel to the pivot 22 and arranged, when in operation, substantially diametrically with respect to the inlet clapper 20, the opposite ends of the arched portion 36 are provided with horizontally alined upper surfaces 37 which are transversely rounded to provide suitable bearing surfaces. The arched portion 36 is provided centrally upon its under side with a substantially semispherical boss 38 integral therewith which is arranged to engage in a corresponding semispherical recess 38' provided therefor centrally in the upper surface of the inlet clapper 20. The inlet clapper is provided upon its upper surface and adjacent its margin with two rounded diametrically opposed bosses 39 which are normally spaced slightly below the opposite ends of the arched portion 36 and which are arranged to prevent the arched portion from flexing beyond the limit of safety.

For clamping the yoke 35 against the inlet valve 20, a bifurcated bell crank lever 40 is arranged so that its two branches 41 freely span the inlet valve 20 when the inlet valve is in an operative position. This bell crank lever 40 is mounted to oscillate about a fixed axis, parallel to the axis of oscillation of the inlet valve 20, upon two horizontally alined spaced pivots 42 which are carried by and which project inwardly from the main casing 1, and which engage respectively in suitable apertures 42' provided therefor in the ends of the two branches 41 of the lever. The two branches of the lever are provided respectively with two lugs or hooks 43 integral therewith which are arranged to engage the upper surfaces 37 of the ends of the arched portion 36 of the yoke 35 to clamp the yoke in position. The lever bell crank extends upwardly from its axis of oscillation and is provided at its upper end with an aperture 45 in which is rigidly secured a ball joint pin 46 the longitudinal axis of which is arranged in a plane perpendicular to the axis of oscillation of the bell-crank lever 40. This pin projects outwardly from the bell-crank lever 40 and is provided at its outer end with an approximately semispherical bearing surface 47 marginally surrounded by an annular flange 48 integral with the pin.

For holding the bell crank lever 40 in an operative position, a push rod 50, which also acts as a valve stem as will appear hereinafter, is normally arranged in a substantially horizontal direction, and extends through an aperture 51 provided therefor in the partition 27. The inner end of the push rod 50 is enlarged and provided with an approximately semispherical recess 52 in which is arranged the semispherical end 47 of the ball joint pin 46, the push rod 50 being provided with an annular recess 53 in which loosely engages the flange 48 of the stud. The push rod 50 is loosely connected to the stud 46 by means of a retaining plate 54 which is rigidly but detachably secured to the push rod 50 by means of screws 55 and which is provided with a rectangular slot 56 in which a transversely rectangular portion 57 of the ball joint pin 46 loosely engages.

To prevent communication between the intermediate chamber of the main casing 1 and the auxiliary or atmospheric chamber of the auxiliary casing 25 when the inlet valve 20 is open, an annular valve seat 60 is threaded into the opening 51 and the inner enlarged end of the push rod 50 is shaped to provide a flat disk valve 61 adapted to engage against the seat 60 to close the opening 51 when the inlet valve 20 is released, as will appear hereinafter.

For holding the push rod 50 in an operative position, the push rod is provided with an approximately conical outer portion 65 terminating in a rounded end 66 which engages in a corresponding recess 67 provided therefor in the inner end of the adjusting screw 68 which is provided at its outer end with a head 69, and which is threaded through and carried by a boss 70 integral with the upper end of a hook lever 75 which is arranged in a vertical plane to swing about two alined, horizontal, spaced fixed knife edges 76 formed respectively on two spaced pins 77 which are terminally secured in fixed relation to the auxiliary casing 25. The upper end of the hook lever is bifurcated to form two branches 78 and the pins 76 loosely engage respectively in two apertures 79 provided therefor in the branches and which are provided with substantially V-shaped recesses 80 in which engage the knife edges 76. The branches 78 of the hook lever are connected at their upper ends by the boss 70, and by a bridge 81, which is spaced from the boss 70 so as to provide a view opening 82 arranged to facilitate the adjustment of the outer end of the push rod 50 against the inner end of the screw 68.

To hold the lever 75 in an operative position, there is arranged in the auxiliary casing 25 to coöperate with the lower end of the hook lever, a bifurcated counter-weight lever 85 comprising two parallel arms 86 connected by a transverse portion 87 and a bridge 88. This counter-weight lever is arranged to swing about a horizontal pivot 89 which is terminally secured to the auxiliary casing 25 and which extends loosely through apertures 90 provided therefor through the arms 86. The bridge 88 is provided with a horizontal knife edge 91 arranged to engage against the lower end 91' of the hook lever 75. At the free end of the counterweight lever 85 are two counterweights 92 which are detachably clamped against the outer sides of the two arms 86 by means of two rivets 93 extending through apertures 94 provided in the free ends of the arms 86 and through apertures 95 provided therefor in the counterweights. Each counterweight 92 consists of a substantially flat body portion which is arranged in a vertical plane when in an operative position and which is preferably approximately oval in side elevation, having a bottom wall which slopes upwardly and outwardly from the lower edge of the bridge 88 when the counterweight is in an operative position, so as to make it practically impossible to tie the counterweight in an operative position by a wire or cord looped under the counterweight. Each counterweight 92 is provided upon its inner vertical side with a longitudinal recess 96 in which the corresponding arm 86 engages snugly, the recess 96 being preferably of the same depth as the thickness of the arm to bring the inner surface of the body of the counterweight flush with the inner surface of the arm. Each counterweight is also provided upon its inner surface with a marginal flange 97 integral therewith and extending along the lower edge thereof from the lower edge of the bridge 88 to the outer end of the counterweight. These flanges 97 are so proportioned that when the counterweights are in operative positions the flanges meet in a vertical plane spaced midway between the inner surfaces of the two arms 86.

For holding the counterweight lever in an operative position, a tumbler 100 is arranged within the auxiliary casing 25 to oscillate about a fixed horizontal knife edge 101 provided on a horizontal pin 102 which is rigidly secured terminally to the auxiliary casing 25. The pin 102 extends loosely through an aperture 103 provided therefor in the tumbler 100, and the knife edge 101 engages in a corresponding V-shaped recess 106 provided therefor in the wall of the aperture 103. The tumbler 100 is provided with a depending end 107 which is arranged to engage against the front edge of the transverse portion 87 of the counterweight lever 85 to hold the counterweight lever in an operative position. Integral with the tumbler 100 are a pair of oppositely disposed horizontal lugs 108 which are arranged to be engaged respectively by the counterweights 92 for resetting the movable parts of the device, as will appear hereinafter.

For holding the tumbler 100 in an operative position, a vertical strut 110 extends upwardly within the auxiliary casing 25 and is provided with a wedge-shaped lower portion 111 terminating in a rounded lower end 112 which engages in a corresponding recess 113 provided therefor in the upper end of the tumbler 100. This vertical strut 110 is provided adjacent its lower end with an enlarged portion 114 provided with a vertically elongated slot 114' through which loosely engages the horizontal push rod 50, the slot 114' being so arranged that when the inlet valve 20 is released the outer end of the push rod 50 may fall freely to permit the disk valve 61 to swing into engagement with its valve seat 60.

For holding the strut 110 in an operative position, the upper end of the strut is pivotally connected to the under side of an auxiliary clapper valve 115 which is arranged in a lateral extension 116 of the main casing 1 to swing about a horizontal pivot 117 which is terminally secured in a fixed position to the lateral extension 116. This auxiliary valve 115 is arranged to coöperate with an annular valve seat 118 which is threaded through an opening 119 in the bottom wall of the lateral extension 116 and which communicates with the atmospheric chamber 26. To permit of easy access to the auxiliary valve 115 an opening 120 is provided in the wall of the casing above the valve and the removable closure 101 is normally secured over the opening 120. The auxiliary valve 115 is preferably provided with a lug 122 integral therewith and arranged to engage a corresponding lug 123 provided therefor on the cover 121 to limit the upward movement of the valve 115. The upper end of the strut 110 is arranged to be freely detached from the auxiliary valve 115 by moving the upper end of the strut laterally inwardly.

The main casing 1 is provided with a pipe connection 130 leading into the upper portion of the "air" compartment 14 and arranged to be connected to a source of air supply and also to serve as a priming test pipe. A pipe connection 131 leads into the lower portion of the air compartment and is arranged to be connected to a source of water supply for "priming" the "air" compartment and also to serve as a drain pipe for the "air" compartment. A pipe connection 132 leads from the upper portion of the intermediate compartment and is arranged to be connected to an alarm device adapted to operate when the water rises to a sufficient height in the intermediate chamber. The main casing 1 is also provided with a drain pipe 133 leading from the upper portion of the inlet compartment and controlled by a ball check valve arranged to drain the intermediate compartment of any small amount of leakage but adapted to close under a full pressure of water.

To insure free paths of movement for the swinging hook lever 75 and the counterweights 92 the door 32 of the auxiliary casing 25 is provided with two vertically spaced horizontal plates 135 and 136 integral therewith and projecting inwardly therefrom, one of which, 135, is arranged to slide over, and substantially cover, the flat upper surface of the bottom wall of the auxiliary casing, and the other of which, 136, is provided with a transverse longitudinally curved recess 137 in its inner edge and is arranged to freely embrace the intermediate portion of the hook lever 75, when the door 32 is closed. In case any obstruction such as a tool or other foreign article has been left accidentally or intentionally upon the bottom wall of the casing, or in case an attempt has been made to hold the counterweights against operation by a loop of wire or other means extending into the path of the upper plate 136, these plates prevent or oppose the closing of the door 32, and thus act to avoid an accidental or malicious incapacitation of the dry valve to perform its function.

For controlling the flow of water through an automatic sprinkler system, this improved dry valve is connected at its main inlet 2 to a main water supply pipe which leads from any suitable source of water supply and which is adapted and arranged to maintain at all times a sufficient pressure of water in the main inlet compartment 12. The main outlet 5 of the dry valve is connected to a main outlet pipe leading to the sprinkler system, and the air supply pipe 130 is connected to a suitable source of air supply such as a suitable air pump adapted to maintain in the air compartment 14 and in the sprinkler system a sufficient pressure of air, for instance, between 25 and 40 lbs. to hold the water inlet valve 20 normally closed against the water pressure in the inlet compartment 12. The main water pipe and the air pipe 130, leading to the dry valve, are controlled by suitable valves so that the pressure of water and air may be cut off from the dry valve at any time to permit of the dry valve being reset, or for any other purpose.

In setting the dry valve to hold the water inlet valve 20 normally closed, the main water supply pipe, the main outlet pipe, and the air pipe 130, are closed, and the main casing is drained if necessary through the drain pipes 131 and 133 which are then closed. The door is then opened and the movable parts within the main casing are adjusted in operative positions. The door 24 is then closed and secured in position. The air supply pipe 130 is then opened and air is forced into the air compartment 14 and into the sprinkler system until a sufficient pressure is attained to hold the outlet valve 21 and the auxiliary valve 115 in closed positions. The door 32 of the auxiliary casing is then opened and the movable parts within the auxiliary casing are then adjusted in operative positions. Priming water is then admitted to the air compartment 14 through the priming pipe 131, and the main water supply pipe is then opened to fill the inlet compartment 12 with water under a suitable pressure, the water inlet valve 20 being held closed by the action of the air pressure in the outlet compartment 14 upon the auxiliary valve 115, acting through the movable parts hereinbefore described.

When the air pressure in the sprinkler system and in the outlet compartment 14 is reduced below a critical point by releasing the pressure at one or more of the automatic sprinklers as a result of the action of heat or any other cause, the auxiliary valve 115 is permitted to open under the action produced by the gravity of the counterweights 92 acting through the lever 85, tumbler 100, and vertical strut 110. The downward movement of counterweights 92 releases the bridge 88 from the lower end of the hook lever 75 and releases the tumbler 100 from the counterweight lever 85 whereupon the auxiliary valve 115 falls and is held in a closed position and the hook lever 75 is permitted to be swung outwardly under the action of the water pressure in the compartment 12 acting through the inlet valve 20, the yoke 35, the bell crank lever 40, and the push rod 50. The outward swinging of the hook lever 75 permits the outer end of the push rod 50 to fall from engagement with the inner end of the screw 68 and to drop through the vertical slot 114 of the vertical strut 110, and permits the bell crank lever 40 to swing about its pivots 42 to allow the inlet valve 20 to open completely and to simultaneously close the intermediate valve 61 over the opening 51 to prevent communication through the opening between the main casing and the auxiliary casing. After the inlet valve 20 is thus opened the pressure of the water opens the outlet or air valve 21 and the water is thus permitted to flow freely into the sprinkler system.

To prevent the inlet valve 20 from rebounding against its seat when opened under a pressure of water entering through the inlet 3, the valve 20 may be loosely connected to the yoke 35 so as to permit only a limited amount of movement between the valve and the yoke. For instance, the yoke may be provided with two lugs 150 integral therewith and the valve may be provided with a lug 151 projecting upwardly and extending loosely between the lugs on the yoke, the lug on the valve being provided with a vertically elongated slot 152 through which loosely extends a pin 153 which is terminally secured in the lugs 150 of the yoke. It has been found that when the valve is thus loosely connected to the yoke the yoke restrains the valve from rebounding upon its seat.

Although only a single form in which this invention may be embodied has been shown, it is to be understood that the invention is not limited to any specific construction but might be embodied in various forms without departing from the spirit of the invention or the scope of the appended claims.

Having thus fully described this invention, I claim and desire to protect by Letters Patent of the United States:

1. In a valve for a sprinkler system, the combination with a casing provided with an inlet, of a movable valve member arranged to control said inlet, and means to hold said member normally closed, including an element pivoted to swing about a fixed axis and arranged to engage said valve member, and a bifurcated element pivoted to swing about a fixed axis and arranged when in normal position to span said valve member in the direction of said last mentioned axis and to clamp said first mentioned element against said valve member.

2. In a valve for a sprinkler system, the combination with a casing, provided with an inlet, of a valve member pivoted to swing about a fixed axis to control said inlet, an element pivoted to swing coaxially with said valve member, and a bifurcated element arranged to swing about a fixed axis parallel to said first mentioned axis and arranged when in normal position to span said valve member in the direction of said axis of said bifurcated member, and to clamp said first mentioned element against said valve member.

3. In a valve for a sprinkler system, the combination with a casing, provided with an inlet, of a valve member pivoted to swing about a fixed axis to control said inlet, an element pivoted to swing coaxially with and independently of said valve member, and a bifurcated element arranged to swing about a fixed axis parallel to said first mentioned axis and arranged when in normal position to span said valve member in the direction of said axis of said bifurcated member, and to clamp said first mentioned element against said valve member.

4. In a valve for a sprinkler system, the combination with a casing provided with an inlet, of a movable valve member arranged to control said inlet, an element pivoted to swing about a fixed axis, and having a portion extending in a direction substantially parallel to said axis and substantially diametrically with respect to said valve member, and an element arranged to swing about a fixed axis and arranged to engage the opposite ends of said portion to clamp said first mentioned element against said valve member to hold said valve member in normal position.

5. In a valve for a sprinkler system, the combination with a casing provided with an inlet, of a valve arranged to swing about a fixed axis to control said inlet, an element arranged to swing coaxially with said valve member and provided with a transversely extending portion arranged substantially diametrically with respect to said valve member, and arranged to engage said valve member centrally to hold said valve member in normal position, and an element arranged to oscillate about a fixed axis and provided with spaced lugs arranged to engage the opposite ends of said portion to clamp said first mentioned element against said valve member.

6. In a valve for a sprinkler system, the combination with a casing provided with an inlet, of a valve arranged to swing about a fixed axis to control said inlet, an element arranged to swing coaxially with said valve member and provided with a transversely extending portion arranged substantially diametrically with respect to said valve member, and arranged to engage said valve member centrally to hold said valve member in normal position, and an element arranged to oscillate about a fixed axis and provided with spaced lugs arranged to engage the opposite ends of said portion to clamp said first mentioned element against said valve member, said portion having its ends normally spaced slightly from the diametrically opposite marginal portions of said valve member to permit of a limited flexing of said portion under the action of said spaced lugs.

7. In a valve for a sprinkler system, the combination with a casing provided with an inlet, of a movable valve member arranged to control said inlet, and means including an auxiliary valve member and means cooperating therewith for holding said first mentioned valve member in normal position, said last mentioned means including a counterweight lever comprising two substantially parallel spaced arms, a transverse portion connecting said arms, a bridge spaced from said transverse portion and extending between said arms and a counterweight arranged outside of each of said arms and secured thereto.

8. In a valve for a sprinkler system, the combination with a casing provided with an inlet, of a movable valve member arranged to control said inlet, and means including an auxiliary valve member and means cooperating therewith for holding said first mentioned valve member in normal position, said last mentioned means including a counterweight lever comprising two substantially parallel spaced arms, a transverse portion connecting said arms, a bridge spaced from said transverse portion and extending between said arms and a counterweight arranged outside of each of said arms and secured thereto, each of said counterweights being provided with a recess in which one of said arms engages, and with an inwardly projecting marginal flange.

9. In a valve for a sprinkler system, the combination with a casing provided with an inlet, of a valve member pivoted to swing about a fixed axis for controlling said inlet, a member arranged to swing about a fixed axis and to engage said valve member to hold said valve member in a closed position, and means loosely connecting said members to permit of only a limited movement between said members.

In witness whereof, I have hereunto set my hand this 9th day of July, A. D., 1914.

ARTHUR C. ROWLEY.

Witnesses:
LEROY M. LEWIS,
A. IRWIN GARDNER.

Copies of this patent may be obtained for five cents each, by addressing the "Commissioner of Patents, Washington, D. C."